United States Patent [19]

Gardner

[11] 4,414,367
[45] Nov. 8, 1983

[54] CURABLE MOLDING COMPOSITIONS
[75] Inventor: Hugh C. Gardner, Somerville, N.J.
[73] Assignee: Union Carbide Corporation, Danbury, Conn.
[21] Appl. No.: 307,213
[22] Filed: Sep. 30, 1981
[51] Int. Cl.³ ........................................... C08F 283/00
[52] U.S. Cl. ..................................... 525/531; 525/922
[58] Field of Search ............................... 525/531, 922

[56] References Cited

U.S. PATENT DOCUMENTS

| | | | |
|---|---|---|---|
| 3,256,226 | 6/1966 | Fekete | 525/531 |
| 3,373,075 | 3/1968 | Fekete | 525/531 |
| 3,506,736 | 4/1970 | Wajvar | 525/531 |
| 3,621,093 | 11/1971 | Suoboda | 525/531 |
| 3,793,398 | 2/1974 | Hokamvra | 525/531 |
| 3,808,114 | 4/1974 | Tsvchihana | 525/31 |
| 3,825,517 | 7/1974 | Ficarra | 525/31 |
| 3,968,016 | 7/1976 | Wisaer | 525/31 |
| 4,085,018 | 4/1978 | Ariga | 525/31 |

Primary Examiner—Melvyn I. Marquis
Attorney, Agent, or Firm—Donald M. Papuga

[57] ABSTRACT

Described herein are curable liquid homogeneous mixtures used for the rapid production of fiber-reinforced thermoset resin articles which comprise:
(a) a vinyl ester of the following formula:

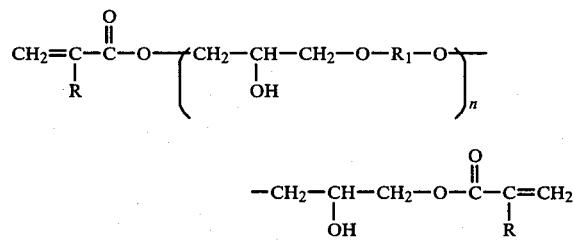

wherein the R's are independently hydrogen or methyl, $R_1$ is the residue of a cycloaliphatic or aromatic diol and n has an average value of from 1 to about 5.
(b) a second crosslinkable oligomer containing two or more unsaturated groups selected from acrylates, methacrylates and fumarate diesters; and
(c) a monoethylenically unsaturated monomer, wherein the ratio of (a) to (b) is greater than about 0.3.

11 Claims, No Drawings

CURABLE MOLDING COMPOSITIONS

This invention is directed to curable molding compositions which are used for producing fiber reinforced articles, such as automotive parts or appliance housings on fast mold cycles.

A novel process for producing fiber reinforced articles is described in U.S. patent application Ser. No. 135,906 entitled "Molding Process and Apparatus Therefore", and filed on Apr. 14, 1980 in the name of R. Angell, Jr., which is incorporated herein by reference. In this application, a process for rapidly fabricating fiber reinforced thermoset resin articles is described. The fiber reinforcement is comprised of one or more fibers with a melting point or a glass transition temperature above about 130° C. The process comprises the steps of (a) providing in a heatable matched metal die mold, a bonded web of one or more of said fibers, (b) providing in an accumulator zone a liquid body of a thermosettable organic material having a viscosity determined at 120° C., in the absence of curing agent therefore, of less than about 50 centipoises, and which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold which is above the temperature at which the curing of said materials is initiated, and (f) opening said mold and removing of the cured thermoset article therefrom. The fiber reinforcement may be from about 15 to about 80 weight percent of the weight of the molded article which is removed from the mold.

A major objective of the process of Ser. No. 135,906 is to produce molded articles with high mechanical properties utilizing short mold cycles. The shorter the mold cycle, the greater the productivity which can be achieved.

Major requirements for the resin in said process are low resin viscosity to allow rapid injection of the resin without movement of the reinforcing fibers and fast cure to allow the use of short molding cycles.

Many types of resins are described as useful in the process described in said application Ser. No. 135,906. These resins contain a monoethylenically unsaturated monomer, such as styrene, and a crosslinkable oligomer containing two or more polymerizable carbon-carbon double bonds. The types of double bonds in the oligomers include acrylates, as in polyacrylate resins; methacrylates as in vinyl ester resins and polymethacrylate resins; fumarate diesters, as in unsaturated polyester resins, and maleate half esters as in maleate half ester resins. Also, resins which contain more than one type of crosslinkable oligomer are described. Such materials can be made by blending a vinyl ester resin and a polyester resin.

Resins containing both vinyl esters and unsaturated polyesters are known in the art. For example, U.S. Pat. No. 3,621,093 describes molding compositions which contain 0.01 to 0.2 parts by weight of a polyacrylate of polyepoxide, i.e., a vinyl ester, per part of unsaturated polyester in the composition. However, with this level of vinyl ester, the mechanical properties of an article molded from the composition are not significantly different from those of articles molded with the polyester alone.

It has now been found that compositions which comprise:

(a) a vinyl ester of the following formula:

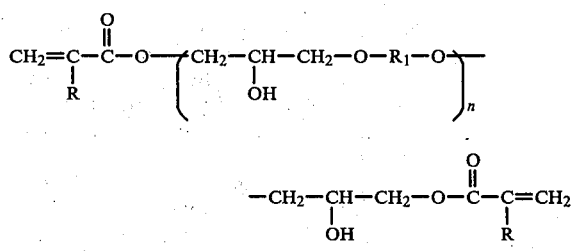

wherein the R's are independently hydrogen or methyl, $R_1$ is the residue of a cycloaliphatic or aromatic diol and n has an average value of from 1 to about 5;

(b) a second crosslinkable oligomer containing two or more unsaturated groups selected from acrylates, methacrylates and fumarate diesters; and (c) a monoethylenically unsaturated monomer, wherein the ratio of (a) to (b) is greater than 0.3, display superior performance in the preparation of fiber reinforced articles on fast mold cycles.

Compared to compositions where the ratio of (a) to (b) is less than 0.3, the compositions of this invention produce composites with improved stiffness and strength.

Additionally as compared to compositions containing component (a) and a component (b) wherein maleate half ester groups comprise the polymerizable carbon-carbon double bonds, the compositions of this invention cure more rapidly. This allows for shorter molding cycles than are achievable with similar compositions containing vinyl esters and maleate half esters.

THE INVENTION

This invention is directed to liquid homogeneous molding compositions used for the rapid production of fiber-reinforced thermoset resin articles which composition comprise:

(a) a vinyl ester of the following formula: (I)

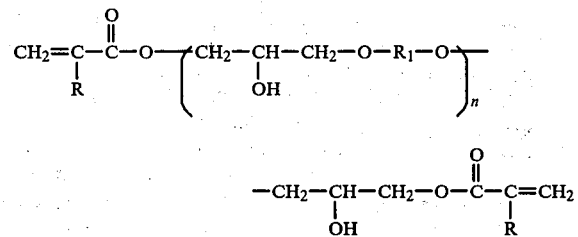

wherein the R's are independently hydrogen or methyl, $R_1$ is the residue of a cycloaliphatic or aromatic diol, and n has an average value of from 1 to about 5; and (b) a second crosslinkable oligomer containing two or more unsaturated groups selected from acrylates, methacrylates and fumarate diesters; and (c) a monoethylenically unsaturated monomer, wherein the ratio of (a) to (b) is greater than 0.3.

In component (a) the cycloaliphatic or aromatic diols suitable for preparing the vinyl ester include 1,4-benzenedimethanol, 1,4-cyclohexanedimethanol, 2,2-bis[4-(2-hydroxyethoxy)phenyl]propane, 2,2-bis[4-(2-hydroxypropoxy)phenyl]propane, 2,2-bis(4-hydroxyphenyl)-propane, 2,2-bis(4-hydroxycyclohexyl)propane, 2,2-bis[3-bromo-4-hydroxyphenyl]-propane, 1,2-bis(4-hydroxyphenyl)ethane, 1,1-bis(4-hydroxyphenyl)-2,2-dichloroethylene, and the like.

The vinyl ester may be prepared by the reaction of acrylic acid or methacrylic acid with an epoxy resin under conditions well known in the art. Typically a stoichiometry of one mole of acid per mole of epoxide is used, and greater than about 88 percent of the unsaturated acid is consumed in the reaction.

Epoxy resins used to form the vinyl ester are typically made using methods well known in the art. They include a batch method wherein the aliphatic or aromatic diol is condensed with an excess of epihalohydrin in the presence of a basic catalyst. Alternatively, epoxy resins may be prepared by chain extension of a diglycidyl ether (such as bisphenol-A diglycidyl ether) with additional diol.

The vinyl ester of (a) may also be made by reacting glycidyl acrylate or glycidyl methacrylate with a cycloaliphatic or aromatic diol.

The preferred vinyl ester is of the following formula:

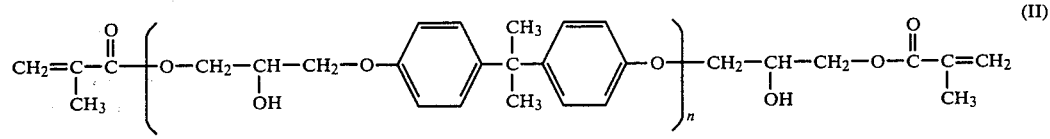

wherein n has an average value of from 1 to about 5.

Vinyl ethers of this type are present in commercial vinyl ester resins such as Derakane 411-C-50, Derakane 411-45 (available from Dow Chemical Co.), Epocryl 321, Epocryl 322, and Epocryl 325 (available from Shell Chemical Co.).

Component (b) may be selected from one or more of the following materials:

(1) An unsaturated polyester. These polyesters are typically the condensation products of a polyol and an unsaturated dicarboxylic acid or anhydride. The polyol is generally selected from ethylene glycol, diethylene glycol, propylene glycol, dipropylene glycol, neopentyl glycol, alkoxylated derivatives of bisphenol-A, 2,2,4-trimethyl-1,3-pentanediol, 2,2-dimethyl-3-hydroxypropyl 2,2-dimethyl-3-hydroxypropionate, 1,3-butanediol, glycerol, trimethylolpropane and pentaerythritol. The unsaturated acids (i.e., those with polymerizable carbon-carbon double bonds) include maleic acid and fumaric acid. Acids without reactive double bonds which may be used in modifying amounts include phthalic acid, isophthalic acid, terephthalic acid, and adipic acid. Anhydrides of the above acids, such as maleic anhydride and phthalic anhydride are often used.

The unsaturated polyesters are generally prepared by heating approximately equimolar amounts of a diol with the carboxylic acid or anhydride at temperatures in excess of about 200° C. for periods of about 4 to about 24 hours. The polyesters typically have number average molecular weights (Mn) in the range of from about 500 to about 5000, and they contain unsaturation distributed along the chain. Most of the unsaturation is present as fumarate diester groups. These polyesters have acid numbers in the range of from about 2 to about 60. (The acid number is the milligrams of potassium hydroxide needed to neutralize one gram of sample). Many of the polyesters have hydroxyl numbers approximately equal to or greater than their acid numbers.

An additional group of polyesters are also contemplated for use herein. These polyesters are prepared by incorporating dicyclopentadiene into the backbone of the polyester. These polyesters are described, for example, in U.S. Pat. Nos. 3,347,806; 3,933,757; 4,029,848; 4,148,765 and 4,224,430. Either dicyclopentadiene or dicyclopentenyl alcohol may be used to prepare the polyester.

(2) A poly(acrylate) or poly(methacrylate) characterized by the following empirical formula:

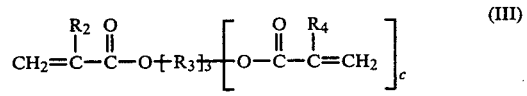

wherein $R_3$ is the hydroxy-free residue of an organic polyhydric alcohol which contained alcoholic hydroxyl groups bonded to different carbon atoms, $R_2$ and $R_4$ are independently hydrogen or methyl, and c is 1 to 3.

The polyhydric alcohol suitable for preparing the poly(acrylate) typically contains at least two carbon atoms and may contain from 2 to 4, inclusive, hydroxyl groups. These polyhydric alcohols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentanediol, dipropylene glycol, propylene glycol, polypropylene glycol having an average molecular weight of about 150 to about 600, triethylene glycol, 1,4-cyclohexanedimethanol, neopentyl glycol, 2,2-dimethyl-3-hydroxypropyl 2,2-dimethyl-3-hydroxypropionate, polyethylene glycol having an average molecular weight of about 150 to 600, 2,2-bis[4-(2-hydroxyethoxy)phenyl]propane, 2,2-bis[4-(2-hydroxypropoxy)phenyl]propane, triethanolamine, 1,3-butanediol, tetraethylene glycol, 2,2-bis(4-hydroxyphenyl)propane, glycerol, trimethylolpropane, 1,4-butanediol, the polycaprolactone ester of trimethylolpropane which contains about 1.5 equivalents of caprolactone, the polycaprolactone ester of trimethylolpropane which contains about 3.6 equivalents of caprolactone, 2-ethyl-1,3-hexanediol, 1,5-pentanediol, tripropylene glycol, 2,2-bis-(4-hydroxycyclohexyl)propane, 1,2,6-hexanetriol, 1,3-propanediol, 1,6-hexanediol and the like. Mixtures of the aforementioned polyols may also be used in this invention.

The poly(acrylate) of the aforementioned organic polyhydric alcohol can be prepared by the reaction of acrylic acid or its simple esters with the polyhydric alcohol under conditions well known in the art. Similarly the poly(methacrylate) may be prepared using methacrylic acid or its simple esters.

Additional crosslinkable oligomers suitable for use component (b) include those with more than one type of the preferred unsaturated groups. For example, acrylated unsaturated polyesters may be used. These oligomers may be prepared by condensing an unsaturated acid such as fumaric acid with an excess of a polyol to produce a predominantly hydroxyl-terminated unsaturated polyester. The latter may be reacted with acrylic acid, an alkyl ester of acrylic acid or an acryloyl halide to produce an acrylated unsaturated polyester.

Component (c) of this invention is a monoethylenically unsaturated monomer which is soluble in and copolymerizable with (a) and (b).

The ethylenically unsaturated monomer contains at least a single $-CH=C<$ group, and preferably a $CH_2=C<$ group and include styrene and its derivatives and homologues, lower alkyl esters of acrylic or methacrylic acid (such as ethyl acrylate, butyl acrylate, and methyl methacrylate), unsaturated nitriles (such as acrylonitrile and methacrylonitrile), and the like. Also the monomers include vinyl esters such as vinyl acetate and vinyl propionate, maleic anhydride and the like. Other monoethylenically unsaturated monomers which may result from the incomplete reaction of the unsaturated acid with the diglycidyl ether may also be used. These include acrylic acid, methacrylic acid, and the monoacrylate- and monomethacrylate derivatives of the diglycidyl ether. Mixtures of the aforementioned monomers may be effectively employed in the practice of this invention.

The most preferred ethylenically unsaturated monomer contemplated in the practice of this invention is styrene.

In the composition of this invention component (a) is present in amounts of from about 7 to about 60, preferably from about 10 to about 45 weight percent, component (b) is present in amounts of from about 5 to about 50, preferably from about 10 to about 45 weight percent, and (c) is present in amounts of from about 20 to about 70, preferably from 30 to about 60 weight percent.

The compositions of this invention can be cured by free radical mechanisms. Sources of free radicals include electron beam radiation, actinic and ultraviolet radiation, as well as azo and peroxide curing agents which are described by, for example, Gallagher, et al., in "Organic Peroxides Review, Plastics Design & Processing", July, 1978, pages 38–42, and August, 1978 pages 60–67, inclusive. The technology disclosed in those two articles is incorporated herein by reference. The choice of the specific peroxide or azo initiator for the purpose of curing the composition of this invention is within the purview of those having skill in this art, and the manner in which such peroxides and azo initiators effect a desirable cure is generally characterized in the aforementioned articles.

Examples of such curing catalysts include 2,2'-azobisisobutyronitrile, benzoyl peroxide, lauroyl peroxide, di-t-butyl peroxide, t-butyl perpivalate, 2,5-dimethylhexane-2,5-di-perethylhexanoate, t-butyl peroctoate, t-butyl perneodecanoate, t-butyl perbenzoate, t-butyl percrotonate, t-butyl perisobutyrate, di-t-butyl perphthalate, 1,1-bis(t-butylperoxy)cyclohexane, 1,1-bis(t-butylperoxy)-3,3,5-trimethylcyclohexane, 2,2-bis(t-butylperoxy)propane, bis(4-t-butylcyclohexyl)peroxydicarbonate, methyl ethyl ketone peroxide, 2,4-pentanedione peroxide, bis(t-butylperoxy) diisopropylbenzene, 2-t-butylazo-2-cyano-4-methylpentane, ethyl 3,3-di(t-butylperoxy)butyrate, and the like. Many of these initiators are commercially available materials.

Perester and perketal curing catalysts may be used in combination with an acid cure accelerator as described in Netherlands published Patent Application No. 7,604,405. These acids include Bronsted acids with a $pK_a$ value lower than or equal to that of formic acid, such as hydrochloric acid, sulfuric acid, nitric acid, phosphoric acid, trichloroacetic acid, p-toluenesulfonic acid, and the like. Also Lewis acids or metal halides with Lewis acid properties, such as boron trifluoride and the chlorides of iron, cobalt, zinc and aluminum, may be used.

Additionally, the above described curing catalysts may be used in combination with other cure accelerators such as cobalt compounds. These cobalt compounds include cobalt naphthenate, cobalt-amine cure promoters (e.g., PEP-183S, available from Air Products and Chemicals, Inc.), and the like.

Mixtures of the curing catalysts may be used herein, such as mixtures of peresters with perketals, perketals with azo compounds, and peresters with azo compounds.

The concentration of the curing agent can be varied within wide limits. As a representative range, the concentration can vary from about 0.25 to about 3.0 weight percent, preferably from about 0.5 to about 2.5 weight percent, and most preferably, from about 0.75 to about 2.0 weight percent, based on the weight of components (a), (b) and (c).

It is furthermore desirable to utilize a vinyl polymerization inhibitor in those cases where the resin solution is to be stored and/or shipped. Suitable vinyl polymerization inhibitors are hydroquinone, para-benzoquinone, t-butyl catechol, t-butylhydroquinone, methylhydroquinone, 2,5-di-t-butylhydroquinone, hydroquinone monomethyl ether, the biphenol derivatives described in U.S. Pat. No. 4,158,027, and the like. The amount of inhibitor for the purpose of preventing vinyl polymerization can be that conventionally used, namely from about 10 to about 1000 ppm of the combined weight of components (a), (b) and (c).

The compositions of this invention cure by free radical mechanisms. New carbon-carbon bonds are formed during the copolymerization of the acrylate or methacrylate groups of component (a), with the acrylate, methacrylate, or fumarate diester groups of component (b), and the $-CH=C<$ or $CH_2=C<$ groups of component (c).

- The compositions of this invention may be prepared by solution blending the vinyl ester, the second crosslinkable oligomer, the ethylenically unsaturated monomer, a free radical curing catalyst, and any other optional ingredients at ambient temperature.

Compositions containing only components (a), (b), and (c) are homogeneous liquid mixtures. They possess viscosities in the range of from about 1 to about 2000 centipoises at room temperature, i.e., 25° C.

Fiber may be included in the compositions of this invention as reinforcing agents. These fibers have a melting point or a glass transition temperature above about 130° C. These fibers include fiberglass, carbon fibers, aromatic polyamide fibers (such as aramid fibers sold by E. I. duPont de Nemours & Company, Wilmington, Del., under the trademark of Kevlar), metal fibers, such as aluminum and steel fibers, boron fibers, and the like.

The carbon fibers include those having a high Young's modulus of elasticity and high tensile strength. These carbon fibers may be produced from pitch, as described in U.S. Pat. Nos. 3,976,729; 4,005,183 and 4,026,788, for example.

The preferred fibers are fiberglass, carbon fibers, aromatic polyamide fibers, and mixtures thereof.

The fibers which are suitable for use in this invention, preferably, have a length of at least ⅛ inch, and an average length of at least ¼ inch. Preferred fiber lengths are from 1 to 2 or more inches. Continuous filaments may also be used.

It is also within the scope of this invention to include the use of particulate fillers such as milled glass or calcium carbonate in combination with the fiber.

An article molded from the fiber reinforced composition of this invention contains from about 10 to about 75, preferably from about 40 to about 70 weight percent of the reinforcing fiber, and optionally from about 10 to about 40 weight percent of the particulate filler.

The composition of this invention may also include other ingredients, such as mold release agents, pigments, and the like.

Molded articles may be rapidly produced from the composition of this invention by several fabrication processes, including pultrusion, resin transfer molding and the process described in U.S. patent application Ser. No. 135,906, supra.

The preferred procedure is described in said U.S. patent application Ser. No. 135,906, supra. In said application the apparatus comprises: (a) a heatable matched metal die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, and (d) cooling means associated with the means for controlling the injection of such liquid into such cavities, whereby the temperature of the liquid in such injection means is maintained substantially below the temperature of the mold.

Alternative apparatus such as a polyurethane RIM (reaction injection molding) machine may also be used.

EXAMPLES

The following examples serve to illustrate specific embodiments of this invention and it is not intended that the invention shall be limited by the examples.

The performance of the compositions of this invention was measured in two types of tests. In the first, fiber reinforced composites were molded, and their properties were compared as a function of resin type. Controls included (1) composites made from resins comprising only components (b) and (c), and (2) composites made from resins containing components (a) and (c) in combination with a second crosslinkable oligomer containing maleate half ester groups, rather than acrylate, methacrylate, or fumarate diester groups, as specified in this invention.

The second test was the SPI gel time test, which was used to study the cure speeds of the resins. Controls in the gel time test included the following compositions:
(1) components (a) and (c) alone;
(2) components (b) and (c) alone; and
(3) components (a) and (c) plus a second crosslinkable oligomer containing maleate half ester groups.

RESIN COMPONENTS

Vinyl Esters (Component A)

Three vinyl esters were used in the Examples and Controls.

Vinyl Ester A was prepared as follows:

A 3-liter round-bottomed flask equipped with a paddle stirrer, drying tube, thermometer, and a heating mantle was charged with 1164 g of Epon 828 (a bisphenol A epoxy resin with a weight per epoxy equivalent of 194, supplied by Shell Chemical Co.) and 1.2 ml of tributyl phosphite. The mixture was heated for 1 hour at 100°–120° C. Then 2.39 g of tetramethylammonium chloride, 0.40 g of methyl hydroquinone, and 516 g of methacrylic acid were added. The mixture was maintained at 100° C. for 3 hours, and then heated at 115° C. for an additional 8.5 hours. At the end of this period, the acid number of the mixture was 5, indicating that over 98 percent of the methacrylic acid had reacted. The product was a vinyl ester of formula (II) wherein the value of "n" was about 1.2.

Vinyl Ester B was a vinyl ester of formula (II) wherein the average value of n was about 2.5. Vinyl ester B was present in a commercial resin (Derakane 411-C-50 from Dow Chemical Co.) which contained 50 weight percent of styrene.

Vinyl Ester C was a vinyl ester of formula (II) wherein n had an average value of about 3.3. This vinyl ester was present in a commercial resin (Derakane 411-45 from Dow Chemical Co.), which contained 45 weight percent of styrene.

Other Crosslinkable Oligomers (Component B)

Four types of crosslinkable oligomers were blended with the vinyl esters. They were polymethacrylates, polyacrylates, unsaturated polyesters, and maleate half esters. The unsaturated polyesters contained fumarate diester double bonds. Oligomers purchased in neat form or as solutions in styrene were as follows:

Polymethacrylate A: Ethoxylated bisphenol A dimethacrylate (SR-348, supplied by Sartomer Co., West Chester, PA)

Polymethacrylate B: Polyethylene glycol 200 dimethacrylate (SR-209, supplied by Sartomer Co.)

Polyacrylate: Ethoxylated bisphenol A diacrylate (SR-349 supplied by Sartomer Co.)

Polyester A: An unsaturated polyester derived from isophthalic acid, maleic anhydride, diethylene glycol and propylene glycol. The polyester had an acid number of 25 and a number average molecular weight of about 2400. The polyester was present in a commercial polyester resin containing 30 weight percent of styrene (type MR 14017 from U.S. Steel Corp.)

Polyester B: An unsaturated polyester derived from maleic anhydride, phthalic anhydride, and propylene glycol. The polyester had an acid number of 32 and a molecular weight of about 1370. It was supplied in a commercial polyester resin containing 40 weight percent of styrene (type MR 13031 from U.S. Steel Corp.).

The remaining crosslinkable oligomers were prepared as follows:

Polyester C

A 3-liter, round-bottomed flask equipped with a paddle stirrer, thermometer, an inert gas inlet and outlet and an electric heating mantle was charged with 522 g of maleic anhydride and 800 g of dicyclopentenyl alcohol (DCPD Alcohol from Velsicol Chemical Co.). The mixture was heated to 140° C. and held at that temperature for 5 hours. At the end of this period, a sample was removed for analysis. NMR spectroscopy and titrimetric methods indicated that the major component of the mixture was the maleate half ester of dicyclopentenyl alcohol.

After a 12 inch packed distillation column and a Barrett trap were installed on the flask, 227 g of diethylene glycol, 0.16 g of methylhydroquinone and 48 g of xylene were added to the mixture. The temperature was gradually increased as byproduct water was collected overhead. Xylene was recycled to aid water removal.

During the next 4.7 hours the temperature of the mixture was raised from 165° to 210° C. After an additional 5.6 hours at 210° C., the mixture had an acid number of 41 when measured in aqueous pyridine. Following cooling to 170° C., the mixture was subjected to a vacuum of 60 millimeters of mercury for one hour to remove residual xylene and water. After cooling to 105° C., it was blended with inhibited styrene for ease of handling. The final polyester resin contained 70 percent by weight of the unsaturated polyester, 30 percent styrene and about 150 ppm of methylhydroquinone. The clear yellow resin had an acid number of 23 and a Brookfield viscosity of 342 centipoises at 25° C.

Polyester D

A 3-liter round bottomed flask equipped with a paddle stirrer, thermometer, a 12-inch packed distillation column fitted with a Barrett trap, an inlet and outlet for inert gas, and an electric heating mantle was charged with 588 g of molten maleic anhydride and 290 g of ethylene glycol. When the mixture became homogeneous (at about 55° C.), 75.6 ml of distilled water was added. The mixture was heated to 90° C. and held at that temperature for one hour. After 495 ml of dicyclopentadiene had been added, the mixture was heated to 120°-130° C. and held at that temperature for 3 hours.

Following addition of 48 g of xylene and 0.42 g of metylhydroquinione, the mixture was heated to 199° C. as water was collected overhead. After 10 hours at 192°-199° C., a viscous amber polyester was obtained. The product had an acid number of 57 when measured in aqueous pyridine, and an acid number of 35 when measured in a pyridine/methanol mixed solvent.

The polyester was cooled to 130° C. and blended with inhibited styrene for ease of handling. The final resin contained 40 weight percent of styrene and about 300 ppm of methylhydroquinone.

Maleate Half Ester A

A 3-liter round bottomed flask equipped with a paddle stirrer, thermometer, an inlet and outlet for inert gas, and an electric heating mantle was charged with 588 g of molten maleic anhydride. The anhydride was heated to 90° C. as 921 g of the 2-mole ethoxylate of bisphenol A was added over a period of one hour. After the reaction mixture was held at 90° C. for four more hours, it was discharged. The product, an amber glass at room temperature, consisted mainly of the bis(maleate half ester) of the diol. Its acid number was 257 when measured in aqueous pyridine.

Maleate Half Ester B

A 10 gallon stainless steel reactor equipped with an agitator and an inert gas inlet and outlet was charged with 21.94 kilograms (kg) of maleic anhydride. When the liquid anhydride was at 63° C., 9.98 kg of molten 2,2,4-trimethyl-1,3-pentanediol and 3.32 kg of propylene glycol were added, causing the temperature of the mixture to drop to 48° C. The mixture was then warmed to 55° C. and treated with 17 g of N-methylimidazole. The mixture was then heated to about 80° C. during the next 50 minutes. After cooling to 61° C., it was treated with an additional 53 g of N-methylimidazole. The mixture was discharged after being reheated to 80° C. and maintained at that temperature for about 3 hours. The product was a viscous amber syrup comprised primarily of the bis(maleate half esters) of 2,2,4-trimethyl-1,2-pentanediol and propylene glycol. Its acid number was 380 when measured in aqueous pyridine.

Resins for Composites and Gel Time Tests

Typically liquid molding compositions comprising a vinyl ester, a second crosslinkable oligomer, and an monoethylenically unsaturated monomer were prepared by blending. In many cases a styrene solution of the vinyl ester was mixed with a styrene solution of the second crosslinkable oligomer in order to facilitate handling. Additional monomer was then added as needed.

The resins, which were normally prepared in 200 to 500 gram quantities, had the following compositions:

Resins for Comparisons Involving Vinyl Ester A:

Example 1
25 weight percent of Polymethacrylate A,
25 weight percent of Vinyl Ester A, and
50 weight percent of styrene.
Control A
50 weight percent of Polymethacrylate A.
50 weight percent of styrene.
Example 2
25 weight percent of Polymethacrylate B,
25 weight percent of Vinyl Ester A, and
50 weight percent of styrene.
Control B
50 weight percent of Polymethacrylate B, and
50 weight percent of styrene.
Example 3
25 weight percent of the Polyacrylate,
25 weight percent of Vinyl Ester A, and
50 weight percent of styrene.
Control C
50 weight percent of the Polyacrylate, and
50 weight percent of styrene.
Example 4
25 weight percent of Polyester A,
25 weight percent of Vinyl Ester A, and
50 weight percent of styrene.
Control D
50 weight percent of Polyester A, and
50 weight percent of styrene.
Example 5
25 weight percent of Polyester B,
25 weight percent of Vinyl Ester A, and
50 weight percent of styrene.
Control E -continued 50 weight percent of Polyester B, and
50 weight percent of styrene.

Example 6
27.5 weight percent of Polyester C,
25.0 weight percent of Vinyl Ester A, and
47.5 weight percent of styrene.

Control F
52.5 weight percent of Polester C, and
47.5 weight percent of styrene.

Control G
50 weight percent of Vinyl Ester A, and
50 weight percent of styrene.

Additional Controls:

Control H
50 weight percent of Maleate Half Ester A, and
50 weight percent of styrene.

Control I
25 weight percent of Maleate Half Ester A,
25 weight percent of Vinyl Ester A, and
50 weight percent of styrene.

Control J
50 weight percent of Maleate Ester B, and
50 weight percent of styrene.

Control K
25 weight percent of Maleate Half Ester B,
25 weight percent of Vinyl Ester A, and
50 weight percent of styrene.

Resins for Comparisons Involving Vinyl Ester B:

Example 7
37.5 weight percent of Polyester A,
12.5 weight percent of Vinyl Ester B, and
50 weight percent of styrene.

Example 8
25 weight percent of Polyester A,
25 weight percent of Vinyl Ester B, and
50 weight percent of styrene.

Example 9
12.5 weight percent of Polyester A,
37.5 weight percent of Vinyl Ester B, and
50 weight percent of styrene.

Example 10
25 weight percent of Polyester D,
25 weight percent of Vinyl Ester B, and
50 weight percent of styrene.

Control L
50 weight percent of Vinyl Ester B, and
50 weight percent of styrene.

Control M
50 weight percent of Polyester D, and
50 weight percent of styrene.

Resins for Comparisons Involving Vinyl Ester C:

Example 11
25 weight percent of Polymethacrylate A,
25 weight percent of Vinyl Ester C, and
50 weight percent of styrene.

Control N
50 weight percent of Vinyl Ester C, and
50 weight percent of styrene.

Control O
25 weight percent of Maleate Half Ester A,
25 weight percent of Vinyl Ester C, and
50 weight percent of styrene.

Control P
25 weight percent of Maleate Half Ester B,
25 weight percent of Vinyl Ester C, and
50 weight percent of styrene.

Preparation of Composites

The compositions in Examples 1 through 10 and in Controls A through F, H, I and M were used to prepare fiber reinforced composites. All resins were blended with 1.0 phr (parts by weight per hundred parts of resin) of t-butyl perbenzoate and with 0.5 phr of Zelec UN (an organophosphate mold release agent sold by E. I. duPont deNemours, Wilmington, Delaware). All composites were molded using type AKM chopped strand mat (from PPG Industries, Pittsburgh, Pennsylvania). The following procedure was used:

Six plies of glass mat with approximate dimensions of $6\frac{7}{8} \times 6\frac{7}{8}$ inches and weighing 80 to 90 g were placed in a heated press at 140° C. having a cavity of $7 \times 7 \times \frac{1}{8}$ inches. After the press was closed, the resin was injected in 5 seconds. A hydrostatic pressure of about 250 psi was maintained on the resin for 55 seconds, and then the pressure was released. The part was maintained in the mold for an additional 60 seconds (total cure time was 2 minutes). Then the press was opened and a hot rigid part was removed. The part weight was 146 to 160 g.

Although the speed at which these resins cured varied as a function of resin type, all cured within the two minute cure time used to make this series of composites.

Composites were tested to determine flexural strength and flexural modulus according to ASTM D-790. Glass contents were determined by ashing.

Table I shows the results for resins containing Vinyl Ester A and polymethacrylates as the second cross-linkable oligomer

TABLE I

|  | Example 1 | Control A | Example 2 | Control B |
|---|---|---|---|---|
| Resin Components (wt %) | | | | |
| Polymethacrylate A | 25 | 50 | 0 | 0 |
| Polymethacrylate B | 0 | 0 | 25 | 50 |
| Vinyl Ester A | 25 | 0 | 25 | 0 |
| Styrene | 50 | 50 | 50 | 50 |
| Composite Properties | | | | |
| Flexural Strength ($10^3$ psi) | 33.8 | 23.6 | 27.6 | 18.8 |
| Flexural Modulus ($10^6$ psi) | 1.46 | 1.10 | 1.45 | 1.25 |
| Glass Content (wt %) | 54 | 53 | 57 | 60 |

The results show that the flexural strength and modulus of the composite made with the resin of Example 1 were superior to those of the composite made with the resin of Control A. The same trends are observed in the composites made from the resins of Example 2 and Control B. Thus, replacement of a portion of Polymethacrylate A (or Polymethacrylate B) with Vinyl Ester A results in composites with improved properties.

Table II shows the results obtained with resins containing the polyacrylate. The composite made from the resin in Example 3 had higher flexural properties than the composite made from the resin in Control C.

TABLE II

|  | Example 3 | Control C |
|---|---|---|
| Resin Components (wt %) | | |
| Polyacrylate | 25 | 50 |
| Vinyl Ester A | 25 | 0 |
| Styrene | 50 | 50 |
| Compositie Properties | | |
| Flexural Strength ($10^3$ psi) | 32.8 | 26.8 |
| Flexural Modulus ($10^6$ psi) | 1.36 | 1.32 |
| Glass Content (wt %) | 50 | 52 |

Table III shows the results obtained with resins containing unsaturated polyesters and Vinyl Ester A.

TABLE III

|  | Example 4 | Control D | Example 5 | Control E | Example 6 | Control F |
|---|---|---|---|---|---|---|
| Resin Components (wt %) | | | | | | |
| Polyester A | 25 | 50 | | | | |
| Polyester B | | | 25 | 50 | | |
| Polyester C | | | | | 27.5 | 52.5 |
| Vinyl Ester A | 25 | 0 | 25 | 0 | 25 | 0 |
| Styrene | 50 | 50 | 50 | 50 | 47.5 | 47.5 |
| Composite Properties | | | | | | |
| Flexural Strength ($10^3$ psi) | 37.8 | 27.3 | 29.2 | 20.0 | 33.6 | 26.7 |
| Flexural Strength ($10^6$ psi) | 1.56 | 1.44 | 1.30 | 1.27 | 1.46 | 1.41 |
| Glass Content (wt %) | 52 | 56 | 49 | 53 | 52 | 52 |

Composites made from resins in the Examples possessed higher flexural strengths and moduli than those made from the corresponding control resins. These results indicate that replacement of a portion of the polyester by an equal weight of Vinyl Ester A results in composites with improved properties.

Table IV shows the results obtained with unsaturated polyesters and Vinyl Ester B.

TABLE IV

|  | Example 7 | Example 8 | Example 9 | Control D | Example 10 | Control M |
|---|---|---|---|---|---|---|
| Resin Components (wt %) | | | | | | |
| Polyester A | 37.5 | 25 | 500 | 0 | | |
| Polyester D | 0 | 0 | 0 | 0 | 25 | 50 |
| Vinyl Ester B | 12.5 | 25 | 37.5 | 0 | 25 | 0 |
| Styrene | 50 | 50 | 50 | 50 | 50 | 50 |
| Composite Properties | | | | | | |
| Flexural Strength ($10^3$ psi) | 32.9 | 40.6 | 42.4 | 27.3 | 33.7 | 22.0 |
| Flexural Strength ($10^6$ psi) | 1.75 | 1.78 | 1.78 | 1.44 | 1.46 | 1.43 |
| Glass Content (wt %) | 57 | 57 | 59 | 56 | 53 | 54 |

The results with resins from Examples 7, 8 and 9, and Control D indicate that significant improvements in composite flexural strengths and moduli were obtained by replacing as little as one fourth of Polyester A with Vinyl Ester B. With polyester D, the composite made with the resin blend from Example 10 had higher properties than that made with the polyester resin alone (from Control M).

Table V shows results obtained using resins which are outside the scope of this invention.

TABLE V

|  | Control H | Control I |
|---|---|---|
| Resin Components (wt %) | | |
| Maleate Half Ester A | 50 | 25 |
| Vinyl Ester A | 0 | 25 |
| Styrene | 50 | 50 |
| Composite Properties | | |
| Flexural Strength ($10^3$ psi) | 43.7 | 37.1 |
| Flexural Modulus ($10^6$ psi) | 1.75 | 1.51 |
| Glass Content (wt %) | 51 | 52 |

In Control I, Vinyl Ester A was blended with Maleate Half Ester A. The composite made from the resin in this Control had lower properties than that made from the resin in Control H, which did not contain Vinyl Ester A.

Therefore, composites with improved properties were obtained by substituting vinyl esters for a portion of the crosslinkable oligomers in resins containing polyacrylates, polymethacrylates, unsaturated polyesters, but not maleate half esters.

Gel Time Test Results

The compositions in Examples 1 through 6, 8, 10 and 11 and Controls A through P were tested in the SPI gel time test using the procedure described by A. L. Smith, 6th SPI, Chicago, Ill., 1951, Reinforced Plastics Division, Section 1, page 1.

In the gel time test the temperature of the curing resin mass is recorded as a function of time. At a test temperature of 180° F., the following data may be obtained:

(1) the gel time (i.e., the time from 150° F. to 190° F.);
(2) the interval (the time from 190° F. to the peak temperature);
(3) the total time (the sum of gel time plus the interval); and
(4) the peak temperature.

It has been found that the length of the interval is directly proportional to the cure speed of a resin during the molding of composites by the process described in U.S. application Ser. No. 135,906, supra. Thus, resins with short intervals are preferred because they produce composites on fast molding cycles.

All resins in the gel time test were catalyzed with 1 phr of benzoyl peroxide and were cured in 19×150 mm test tubes at a bath temperature of 180° F. (82.3° C.).

Table VI shows the results for resins containing Polymethacrylates and Vinyl Ester A.

TABLE VI

|  | Example 1 | Control A | Control G | Example 2 | Control B |
|---|---|---|---|---|---|
| Resin Components (wt %) | | | | | |
| Polymethacrylate A | 25 | 50 | 0 | 0 | 0 |
| Polymethacrylate B | 0 | 0 | 0 | 25 | 50 |
| Vinyl Ester A | 25 | 0 | 50 | 25 | 0 |
| Styrene | 50 | 50 | 50 | 50 | 50 |
| Gel Time Test Results | | | | | |
| Interval (min) | 4.0 | 5.0 | 2.8 | 4.0 | 4.3 |
| Peak Temperature (°C.) | 218 | 216 | 220 | 234 | 241 |

The cure characteristics of the blend resin (from Example 1) were compared with those of the base resins (from Controls A and G). The results show that the interval and peak temperature for the resin in Example 1 were intermediate between those of Control A and Control G, indicating blending had no adverse effects on cure.

Table VII shows the results for resins containing Polymethacrylate A and Vinyl Ester C.

TABLE VII

|  | Example 11 | Control A | Control N |
|---|---|---|---|
| Resin Components (wt %) | | | |
| Polymethacrylate A | 25 | 50 | 0 |
| Vinyl Ester C | 25 | 0 | 50 |
| Styrene | 50 | 50 | 50 |
| Gel Time Test Results | | | |
| Interval (min) | 4.9 | 5.0 | 3.9 |
| Peak Temperature (°C.) | 218 | 216 | 194 |

The interval for the blend resin (from Example 11) was intermediate between those of the base resins.

Table VIII shows the results with resins containing unsaturated polyesters and Vinyl Ester A.

TABLE VIII

|  | Example 4 | Control D | Control G | Example 5 | Control E | Example 6 | Control F |
|---|---|---|---|---|---|---|---|
| Resin Components (wt %) | | | | | | | |
| Polyester A | 25 | 50 | 0 | 0 | 0 | 0 | 0 |
| Polyester B | 0 | 0 | 0 | 25 | 50 | 0 | 0 |
| Polyester C | 0 | 0 | 0 | 0 | 0 | 27.5 | 52.5 |
| Vinyl Ester A | 25 | 0 | 50 | 25 | 0 | 25 | 0 |
| Styrene | 50 | 50 | 50 | 50 | 50 | 47.5 | 47.5 |
| Gel Time Test Results | | | | | | | |
| Interval (min) | 1.9 | 1.9 | 2.8 | 2.1 | 1.9 | 2.8 | 3.8 |
| Peak Temperature (°C.) | 228 | 232 | 220 | 239 | 237 | 222 | 218 |

For the blend resin from Example 4, the interval is equal to that of the resin in Control D and less than that in Control G. Similarly, the interval for the resin from Example 6 was equal to that of the resin from Control G and less than that from Control F. The interval for the resin from Example 5 was intermediate between that of the base resins (from Control E and Control G). Overall, resins containing blends of Vinyl Ester A and unsaturated polyesters displayed good cure characteristics compared to those of the base resins.

Table IX shows the results with resins containing unsaturated polyesters and Vinyl Ester B.

TABLE IX

|  | Example 8 | Control D | Control L | Example 10 | Control M |
|---|---|---|---|---|---|
| Resin Components (wt %) | | | | | |
| Polyester A | 25 | 50 | 0 | 0 | 0 |
| Polyester B | 0 | 0 | 0 | 25 | 50 |
| Vinyl Ester B | 25 | 0 | 50 | 25 | 0 |
| Styrene | 50 | 50 | 50 | 50 | 50 |
| Gel Time Test Results | | | | | |
| Interval (min) | 2.7 | 1.9 | 4.0 | 2.9 | 2.3 |
| Peak Temperature (°C.) | 215 | 232 | 197 | 218 | 227 |

The interval and peak temperature for the resin from Example 8 were intermediate between those of the base resins (from Controls D and L). Similar results were obtained for the resin in Example 10 as compared to the resins in Controls L and M.

Table X shows results for resins which are outside the scope of this invention. The cure characteristics of resins containing Vinyl Ester A and various Maleate Half Esters were as follows:

TABLE X

|  | Control I | Control H | Control G | Control K | Control J |
|---|---|---|---|---|---|
| Resin Components (wt %) | | | | | |
| Maleate Half Ester A | 25 | 50 | 0 | 0 | 0 |
| Maleate Half Ester B | 0 | 0 | 0 | 25 | 50 |
| Vinyl Ester A | 25 | 0 | 50 | 25 | 0 |
| Styrene | 50 | 50 | 50 | 50 | 50 |

TABLE X-continued

| | Control I | Control H | Control G | Control K | Control J |
|---|---|---|---|---|---|
| Gel Time Test Results | | | | | |
| Interval (min) | 7.0 | 3.5 | 2.8 | 5.3 | 2.5 |
| Peak Temperature (°C.) | 190 | 232 | 220 | 219 | 247 |

The resin blend of Control I had a much longer interval and a lower peak temperature than either of the base resins (from Controls H and G). The resin blend of Control K also had a much longer interval than either of the base resins (from Controls J and G). Therefore, in contrast to resin blends of Vinyl Ester A with polyacrylates, polymethacrylates or unsaturated polyesters, resin blends of the vinyl ester with maleate half esters cured more slowly than either of the base resins. This characteristic is undesirable since it indicates that longer molding cycles must be used to cure such blends.

Table XI shows the results for resins containing Vinyl Ester C and various maleate half esters.

TABLE XI

| | Control O | Control H | Control N | Control P | Control J |
|---|---|---|---|---|---|
| Resin Components (wt %) | | | | | |
| Maleate Half Ester A | 25 | 50 | 0 | 0 | 0 |
| Maleate Half Ester B | 0 | 0 | 0 | 25 | 50 |
| Vinyl Ester C | 25 | 0 | 50 | 25 | 0 |
| Styrene | 50 | 50 | 50 | 50 | 50 |
| Gel Time Test Results | | | | | |
| Interval (min) | 6.6 | 3.5 | 3.9 | 6.1 | 2.5 |
| Peak Temperature (°C.) | 202 | 232 | 194 | 210 | 247 |

The resin blend of Control O had a much longer interval than either of the base resins (from Controls H and N). The interval for the resin blend of Control P was much longer than those of the base resins (from Controls J and N). Therefore the data in Tables X and XI shows that slower cure speeds were observed for maleate half ester/vinyl ester blends with vinyl esters of formula (II) wherein the average value of 'n' ranged from about 1.2 (as in Vinyl Ester A) to about 3.3 (as in Vinyl Ester C).

What is claimed is:

1. A liquid homogeneous molding composition used for the rapid production of fiber-reinforced thermoset resin articles which composition comprises:

(a) a vinyl ester of the following formula:

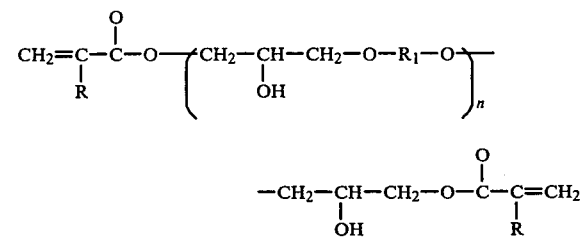

wherein the R's are independently hydrogen or methyl, $R_1$ is the residue of a cycloaliphatic or aromatic diol and n has an average value of from 1 to about 5;

(b) a second crosslinkable oligomer containing two or more unsaturated groups selected from acrylate, or methacrylates; and (c) a monoethylenically unsaturated monomer, wherein the weight ratio of (a) to (b) is greater than 0.3.

2. A composition as defined in claim 1 wherein the vinyl ester resin is of the following formula:

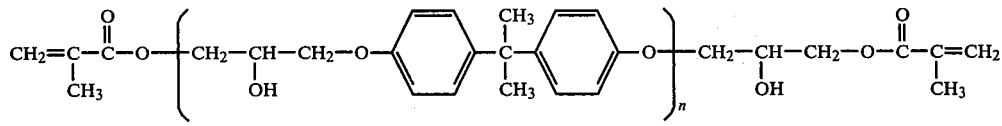

wherein n has an average value of from 1 to about 5.

3. A composition as defined in claim 1 wherein component (b) is a poly(acrylate) characterized by the following empirical formula:

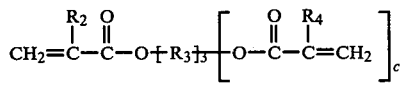

(III)

wherein $R_3$ is the hydroxyl-free residue of an organic polyhydric alcohol which contained alcoholic hydroxyl groups bonded to different carbon atoms, $R_2$ and $R_4$ are independently hydrogen or methyl, and c is 1 to 3.

4. A composition as defined in claim 1 wherein component (b) is an acrylated unsaturated polyester.

5. A composition as defined in claim 1 wherein the monoethylenically unsaturated monomer comprises styrene.

6. A composition as defined in claim 1 wherein component (a) is present in amounts of from about 7 to about 60 weight percent.

7. A composition as defined in claim 1 wherein component (b) is present in amounts of from about 5 to about 50 weight percent.

8. A composition as defined in claim 1 wherein component (c) is present in amounts of from about 20 to about 70 weight percent.

9. A composition as defined in claim 1 which contains a reinforcing fiber.

10. A composition as defined in claim 9 wherein the reinforcing fiber is selected from fiberglass, carbon fibers or aromatic polyamide fibers.

11. An article molded from the composition of claims 1 or 9 or 10.

* * * * *